April 14, 1942.                H. R. CHILDS                2,279,366
                    CELLULOSE DERIVATIVE CREPE SHEETING
                           Filed March 17, 1936
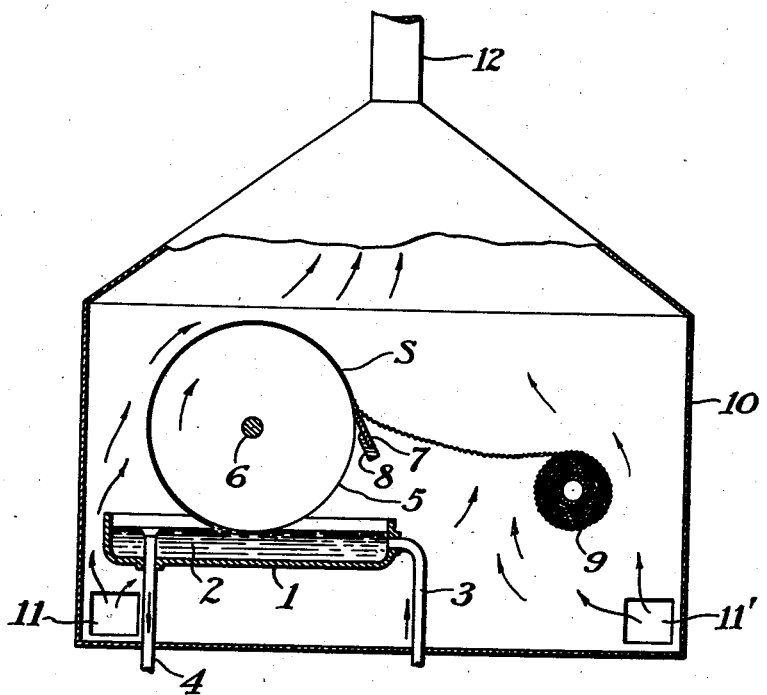
                                                    INVENTOR
                                                 Henry R. Childs
                            BY
                                                    ATTORNEYS Patented Apr. 14, 1942

2,279,366

UNITED STATES PATENT OFFICE 2,279,366

CELLULOSE DERIVATIVE CREPE SHEETING

Henry R. Childs, Kingsport, Tenn., assignor, by mesne assignments, to Eastman Kodak Company, Rochester, N. Y., a corporation of New Jersey Application March 17, 1936, Serial No. 69,351

12 Claims. (Cl. 18—57)

This invention relates to the manufacture of crepe sheeting from solutions of organic derivatives of cellulose, and more particularly to the manufacture of cellulose acetate crepe sheeting.

As is well known, cellulosic sheeting of various kinds has found wide use in numerous fields for which paper was formerly employed. Regenerated cellulose and cellulose acetate thin sheeting have been extensively used as wrapping materials and for decorative purposes, in many cases superseding paper because of many advantages, such as waterproofness, resistance to moisture, more attractive appearance, transparency, and numerous other properties. Of late there has been a considerable demand for materials suitable for decorative purposes, such as the manufacture of lamp shades and novelty wrappings for a variety of products. Although cellulose acetate thin sheeting has come rather widely into vogue as a wrapping material, so far as I am aware, it has never been thought possible to produce a crepe type of cellulose derivative sheeting comparable to crepe paper.

This invention has as its principal object to produce cellulose derivative crepe sheeting. A further object is to produce a type of cellulose derivative sheeting which is especially adapted for use as a decorative and wrapping material. A still further object is to produce a thin crepe cellulose acetate sheet. Other objects will appear hereinafter.

These objects are accomplished by the following invention which, in its broader aspects, comprises the deposition of a solution of cellulose acetate or other suitable derivative of cellulose in a volatile solvent on an appropriate sheet-forming surface, coagulating the sheet thus formed, and thereafter mechanically scraping the sheet from the sheet-forming surface while the material still contains a relatively high percentage of solvent and is still in a somewhat plastic or moldable condition. Under these circumstances, the sheet is not "stripped" from the coating surface as is the case in the manufacture of flat-surfaced sheeting, but is scraped or otherwise mechanically removed therefrom in such manner that minute wrinkles or folds are produced therein. After the removal of the crepe sheet from the surface, the remaining solvent is removed therefrom by appropriate curing and the sheet is then in condition to be used.

In the following examples and description I have set forth several of the preferred embodiments of my invention, but they are included merely for purposes of illustration and not as a limitation thereof.

In the single figure of the drawing there is shown an elevational view in partial section of one type of device suitable for carrying out my invention.

Referring to the drawing, the numeral 1 designates a trough containing a supply of cellulose derivative solution 2, the solution being fed thereto by means of inlet conduit 3. A constant level is maintained by means of overflow conduit 4, which conveys excess solution from the trough back to the main source of supply for adjustment of solvent content and reuse. Numeral 5 designates an internally heated coating wheel or drum 5, mounted on shaft 6 driven by a source of power (not shown). The surface of wheel 5 may be polished, if desired, although this is not as essential as in the manufacture of perfectly smooth sheeting.

The wheel makes contact at its lower portion with the surface of the cellulose derivative solution contained in trough 1, and as the wheel slowly rotates in the direction indicated by the arrow, it is coated with a thin layer of the solution which coagulates by evaporation of the solvent. Upon passing through about two-thirds or three-fourths of a revolution on the wheel, the material which is now in the form of a sheet containing a relatively high percentage (100 to 200%, based on the weight of the cellulose derivative material) of the solvent, is scraped from the wheel surface by means of scraper knife 7, carried by a supporting bar 8, appropriately mounted by means (not shown) to cause the knife to bear lightly upon the wheel 5. The sheet material at the point of scraping from the sheet-forming surface is in a relatively soft, plastic condition in which it may be easily deformed or molded. The scraping action serves to put numerous minute, substantially parallel wrinkles or "crimps" in the material. As the sheet passes towards the wind-up roll 9, further solvent evaporates therefrom and the sheet sets in its wrinkled, crimped, or creped condition.

In order to provide for proper coagulation and curing of the material, the drum 5 may be internally heated by steam having a temperature corresponding to 20 pounds pressure or by equivalent means. Furthermore, the sheet-making mechanism is entirely enclosed within the housing 10, which is provided with a source of heated air which enters the enclosure by means of ports 11, and 11' and is conducted therefrom through vapor conduit 12. During the course of the sheet-forming operation the cellulose derivative material is thus constantly subjected to the action of an evaporative atmosphere which, not only serves to coagulate the sheet while it is still on the sheet-forming surface, but also serves to cure out the solvent remaining in the crimped or creped material after it leaves the sheet-forming surface. The solvent-laden atmosphere issuing from the conduit 12, may be conducted to an appropriate solvent recovery apparatus (not shown) where solvents are condensed and reused in making up the supply of cellulose derivative sheet-forming solution.

It should be noted that the speed of the wheel 5, should be sufficiently low to permit of evaporation of the desired amount of solvent from the sheet while it is still on the sheet-forming surface. This speed may of course vary depending upon the amount of solvent which it is desired to leave in the sheet at the time of performing the actual creping operation.

It will be evident that almost any type of cellulose derivative solution may be employed in my process. However, I prefer to use solutions of cellulose acetate for this purpose, as the sheeting produced from this material has superior qualities. A typical solution for the manufacture of cellulose acetate sheeting has the following composition in percentages by weight:

| | Per cent |
|---|---|
| Cellulose acetate | 3.2 |
| Dimethyl phthalate | 1.7 |
| Acetone | 95.1 |

Among other thermoplastic cellulose compounds which may be employed are cellulose nitrate, cellulose propionate, cellulose butyrate, cellulose acetate propionate, cellulose acetate butyrate, cellulose acetate stearate, the cellulose ethers, such as methyl cellulose, ethyl cellulose and benzyl cellulose.

The solutions used for producing the sheeting may contain any desired appropriate ingredients, such as plasticizers, fillers, dyes, and other materials. Among plasticizers which are particularly appropriate for the manufacture of cellulose acetate sheeting are dimethyl phthalate, triphenyl phosphate, and glycerol tripropionate. The amount of such plasticizer may vary from 30–50% based on the weight of the cellulose acetate.

The concentration of the cellulose derivative in the solution may also vary rather widely. For example, I find a concentration of about 3–20% of the cellulose acetate in acetone gives satisfactory results.

While I have illustrated a process in which the sheet-forming material is deposited by having the coating wheel dip in a bath of the cellulose derivative solution, I may simply deposit the solution on the surface of the wheel by means of the usual type of hopper placed at the upper part of the wheel. This latter method is preferable where an exact control of the thickness of the sheeting is desired. In this modification, the scraper would be positioned in such a manner as to remove the sheet in crepe form from the up-going side of the wheel or drum.

The thickness of the sheet material produced in accordance with my process may vary within rather wide limits. For example, I may produce a material which is of the order of .0015 to .002 inch in thickness. On the other hand I may produce sheeting which has a thickness as great as .005 inch, or greater. By thickness as here referred to, I mean the thickness of the sheet just before it leaves the wheel and before any crimping effect has been produced therein.

The material produced by the process herein described has many outstanding advantages and may be used for numerous purposes. For example, the material may be used in the manufacture of lamp shades, protective and decorative coverings, coverings for fancy boxes and, in fact, for almost any type of use to which crepe paper has heretofore been applied as well as many for which paper would be unsuitable. The material has the outstanding advantage over crepe paper that it is much stronger, is waterproof, moisture resistant and in addition has a soft, sparkling, or iridescent appearance which is unobtainable in paper.

The material is also especially valuable when used as insulating material, especially in connection with devices in which low temperature operations are to be carried out. Many other uses will be apparent to those skilled in the art to which the invention relates.

One of the unique characteristics of the material is its extensibility and its ability to return to its original length after being extended. In other words, it possesses a certain rubber-like elasticity which is largely or wholly absent from crepe paper.

What I claim is:

1. A creped thermoplastic cellulose compound sheet.
2. A creped cellulose organic acid ester sheet.
3. A creped cellulose acetate sheet.
4. A creped material adapted for wrapping and decorative purposes which comprises a sheet of cellulose acetate having a surface resembling crepe paper, said surface containing innumerable minute substantially parallel folds or wrinkles, the sheeting being extensible and having the power to return to substantially its original length after being extended.
5. An article of manufacture comprising a substantially permanently pleated sheet containing an organic derivative of cellulose, said pleated sheet being extensible without loss of its pleated form.
6. An article of manufacture comprising a substantially permanently pleated foil containing an organic derivative of cellulose, said sheet being less than .015 inch thick, said pleated foil being extensible without loss of its pleated form.
7. An article of manufacture comprising a substantially permanently pleated sheet containing cellulose acetate, said pleated sheet being extensible without loss of its pleated form.
8. An article of manufacture comprising a substantially permanently pleated foil containing cellulose acetate, said sheet being less than .015 inch thick, said pleated foil being extensible without loss of its pleated form.
9. An article of manufacture comprising a substantially permanently pleated sheet containing an organic derivative of cellulose and a plasticizer for the organic derivative of cellulose, said pleated sheet being extensible without loss of its pleated form.
10. An article of manufacture comprising a substantially permanently pleated sheet containing cellulose acetate and a plasticizer for the cellulose acetate, said pleated sheet being extensible without loss of its pleated form.
11. An article of manufacture comprising a substantially permanently pleated foil containing an organic derivative of cellulose and a plasticizer, the pleats being of an order less than one-half inch, said pleated foil being extensible without loss of its pleated form.
12. An article of manufacture comprising a substantially permanently pleated foil containing cellulose acetate and a plasticizer, the pleats being of an order less than one-half inch, said pleated foil being extensible without loss of its pleated form.

HENRY R. CHILDS.